Figure 4:
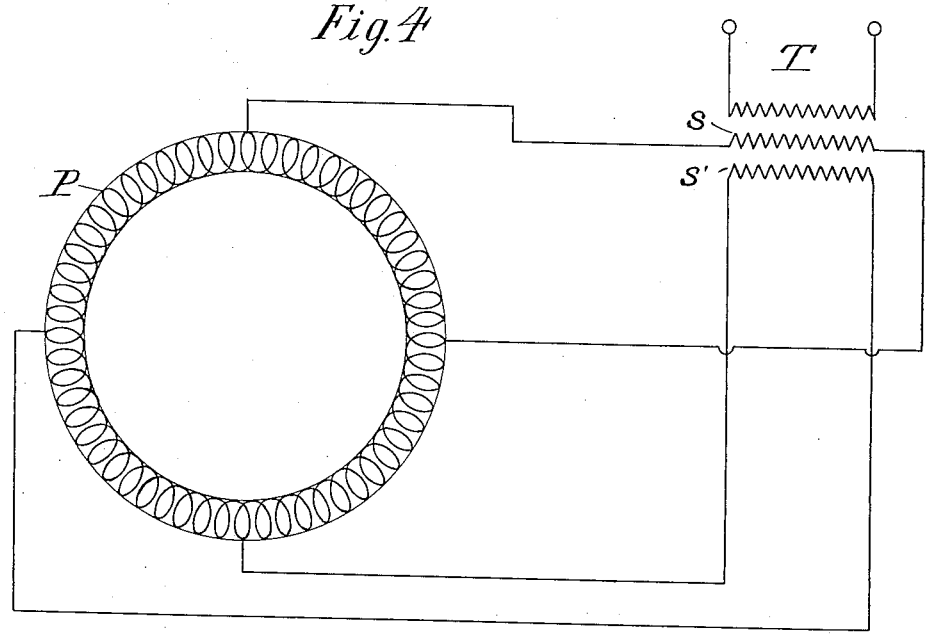

R. D. MERSHON.
VARIABLE SPEED ALTERNATING CURRENT MOTOR.
APPLICATION FILED MAY 28, 1906.
931,136.
Patented Aug. 17, 1909.
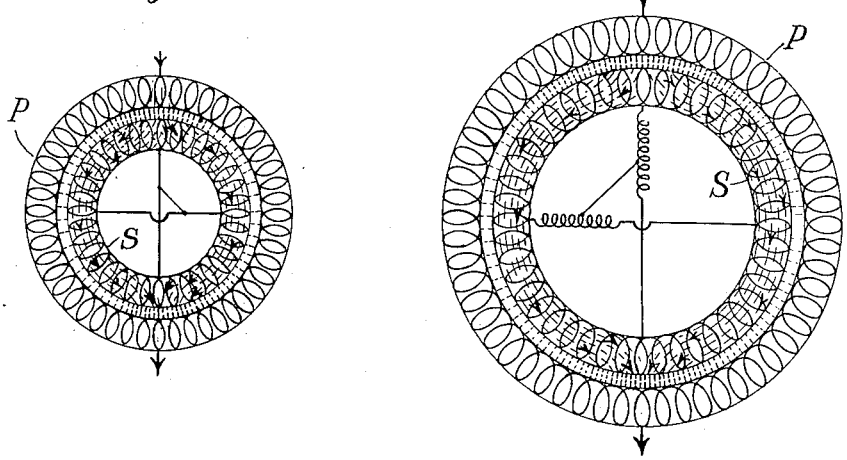
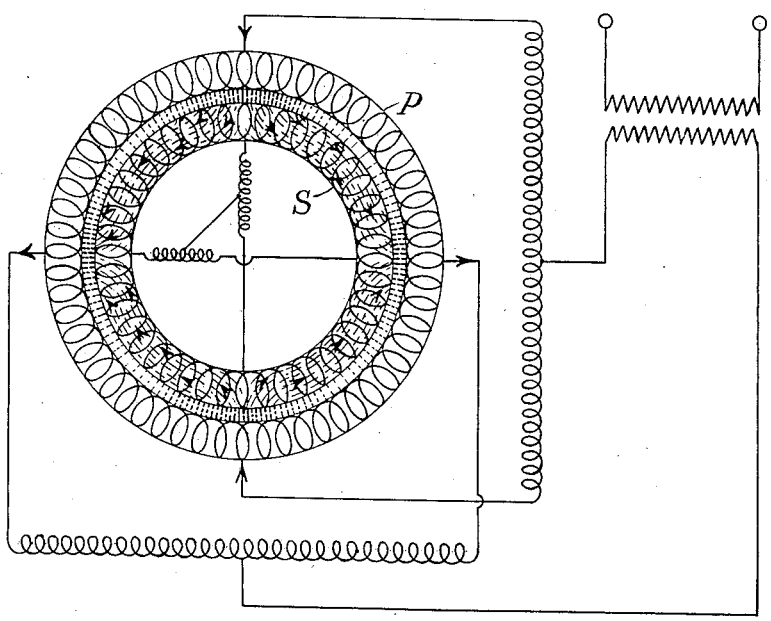

R. D. MERSHON.
VARIABLE SPEED ALTERNATING CURRENT MOTOR.
APPLICATION FILED MAY 28, 1906.

931,136.

Patented Aug. 17, 1909.

3 SHEETS—SHEET 2.

Witnesses
Raphaël Netter
A. A. Dunham

R. D. Mershon, Inventor

By his Attorneys
Kerr, Page & Cooper

R. D. MERSHON.
VARIABLE SPEED ALTERNATING CURRENT MOTOR.
APPLICATION FILED MAY 28, 1906.

931,136.

Patented Aug. 17, 1909.
3 SHEETS—SHEET 3.

Witnesses
Raphaël Netter
S. S. Dunham

R. D. Mershon, Inventor
By his Attorneys
Kerr, Page & Cooper

UNITED STATES PATENT OFFICE.

RALPH D. MERSHON, OF NEW YORK, N. Y.

VARIABLE-SPEED ALTERNATING-CURRENT MOTOR.

No. 931,136.     Specification of Letters Patent.     Patented Aug. 17, 1909.

Application filed May 28, 1906. Serial No. 319,034.

*To all whom it may concern:*

Be it known that I, RALPH D. MERSHON, a citizen of the United States, residing at New York, in the county and State of New York, have invented certain new and useful Improvements in Variable-Speed Alternating-Current Motors, of which the following is a specification, reference being had to the drawing accompanying and forming part of the same.

My invention relates to alternating current motors in which the speed is varied by so-called rheostat control of the secondary, and has for its chief object to provide a motor capable of such speed regulation but without electrically connecting the rheostats, condensers, reactances, or other controlling devices with the secondary.

Figure 5:
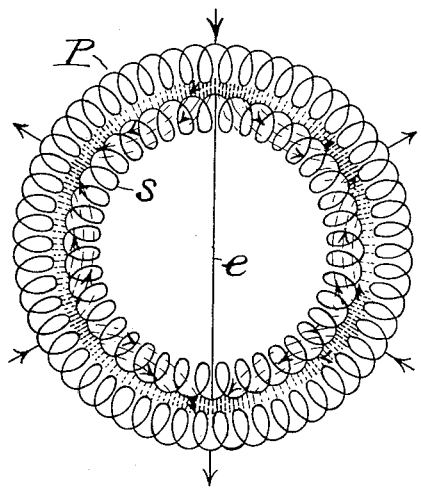
Figure 6:
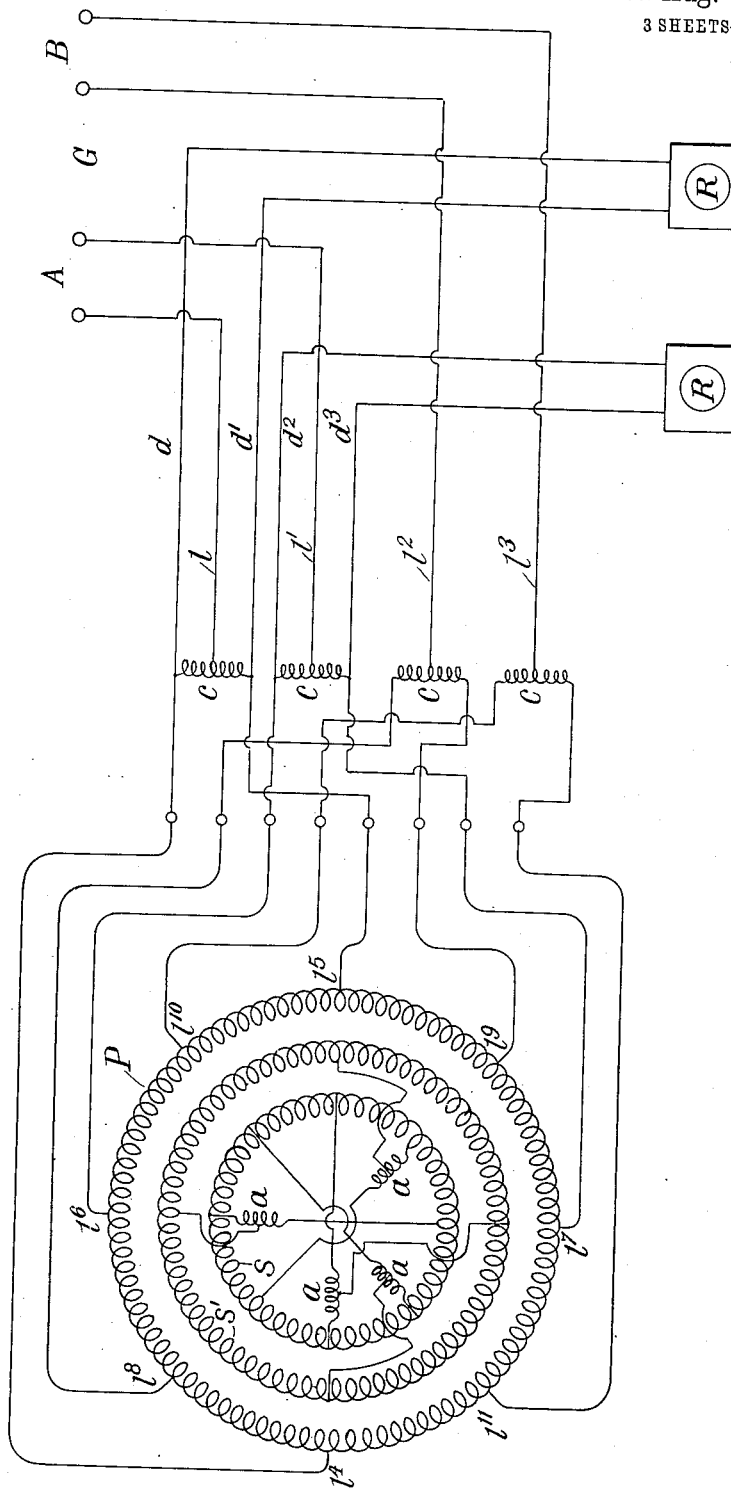

The present invention, which is a species of the generic invention described in my copending application, Ser. No. 319,033, will be more readily understood if an explanation be first given of a certain principle of operation made use of therein. This principle will itself be more readily comprehended when explained with the help of diagrams, and for that purpose reference is now made to the annexed drawings, wherein, Figure 1 shows a machine having a 2-pole primary element and a 4-pole secondary element. Fig. 2 shows a similar machine, but having choke coils or auto-transformers in the connections of the secondary. Fig. 3 shows a 4-pole primary and a 4-pole secondary, with choke coils or auto-transformers in the connections of each. Fig. 4 shows a 4-pole primary, the four poles being produced in a different manner from the method shown in Fig. 3, but with equivalent results for the purposes of this invention. Fig. 5 shows a motor with a 6-pole primary and a 2-pole secondary. Fig. 6 shows a simple and convenient embodiment of the present invention.

Let us suppose that with a primary in which a given number of poles is produced, for example two, we employ a 4-pole secondary whose pole windings are in series or the equivalent. The primary will then have no real effect on the secondary, since adjacent coils being wound in opposite directions, the resultant of the E. M. F.'s. produced therein will be zero. Conversely, a 4-pole primary will have no effect on a 2-pole secondary whose pole windings are in series or the equivalent thereof, for, while each of the four poles in the primary will send a flux through the secondary structure there will be at all times opposite fluxes through each pole of the 2-pole secondary winding, and no E. M. F. will result.

Referring now to Fig. 1, P indicates a primary in which two poles are produced, and S is a 4-pole secondary, the direction of the current in the former at a given instant being indicated by the arrows on the leads, and the corresponding flux by dotted lines. In this secondary, however, current can be produced, for the reason that it is not wound with its poles in series or the equivalent. Suppose now that we insert in each secondary connection a choke-coil or auto-transformer, tapped at its center, as in Fig. 2. Such a choke coil will not allow current, (except that for magnetizing it), to flow through its two halves in series, but will allow equal currents to flow from the ends of the coil to the middle and out through the tap thereat, and will also allow current flowing in through the tap to divide at the coil and flow through the two halves thereof. Hence, in Fig. 2 the 2-pole primary can cause no current flow except that for magnetizing the choke coils or auto-transformers. If now we employ with such a secondary a 4-pole primary (for example as in Fig. 3), current will flow in each half of each auto-transformer and through the taps. Consequently, although the pole windings of the secondary in Fig. 2 are not in series, nevertheless it is by reason of its peculiar connections equivalent (except for the magnetizing current in the auto-transformers) to a 4-pole secondary whose pole windings are in series. It will be observed that in Fig. 3 a similar use of auto-transformers tapped at their middle points is made to obtain a 4-pole winding from the closed coil winding of the primary. If the auto-transformers be omitted and opposite points of the winding might be connected by a simple conductor the arrangement would be equivalent to a 4-pole multiple winding, but would not accomplish certain results hereafter described. It is evident from the foregoing that a 4-pole primary and a 2-pole secondary, or vice versa, may be inductively independent, or, stated more generally, a primary winding for one number of poles may be inductively independent of a secondary winding for another number of poles. This principle is availed of in my invention, and may be aptly termed the principle of "non-mutual" poles or "non-mutual" windings. It may also be stated generally that any windings, whose pole windings are in series or the equivalent thereof as described above, are non-mutual if the larger number of poles divided by the smaller gives 2 or a power thereof as the quotient. Thus 2-pole and 4-pole windings of the kind described are non-mutual, also 2-pole and 8-pole, 6-pole and 12-pole, 12-pole and 24-pole, etc. Other pole numbers, having a different ratio to each other, as 4 and 6, may be non-mutual, as can easily be determined, but generally speaking the combinations most convenient for the purpose hereinafter described will be found to be those in which the ratio is 2 or a power thereof, as stated above. With still other ratios, as for example, in the case of 6-pole and 2-pole windings, the two may be partly non-mutual. The instance just mentioned is illustrated in Fig. 5, in which the primary P of the motor has six poles while the secondary S is connected for two poles by the conductor $e$. It will be seen that only a part of the magnetization of the 6-pole primary can be effective on the 2-pole secondary. However, to the extent that the former is not effective on the latter they are non-mutual. A combination of this kind, that is, one in which the non-mutuality is only partial, can be used for the purposes of my invention, but with results less satisfactory than with combinations in which the windings are wholly non-mutual. By analogy with the foregoing, windings which are not electro-magnetically independent may be said to be mutual to each other.

It is not necessary that auto-transformers, connected as described above, be used to make windings of the closed coil type illustrated, non-mutual. The same results can be obtained by using separate secondaries on the supply transformers, in the case of the primary element of the motor; and, in the case of the motor secondary, by using separate secondaries on a transformer connected thereto. This method is illustrated in Fig. 4, in which $s$, $s'$ are the separate secondaries on the supply transformer T. With open coil windings with their pole windings in series no auto-transformers are required to obtain the condition of non-mutuality, but this method requires the use of a plurality of windings and is in general not so desirable as the methods which may be employed with a single winding.

Keeping the above explanation in mind the invention will be readily understood from a description of a simple embodiment thereof, shown in Fig. 6. In this figure, P designates the primary winding, and S and S' designate two secondary windings, both secondaries being preferably on the same rotating part. The windings of the motor may be of the drum, polar, or any other type, as for example the single ring windings shown. G indicates the source of current, which may be single or polyphase, for example two-phase as shown, the two phases being for convenience designated A and B. The leads from the source are indicated by $l$, $l'$ and $l^2$, $l^3$, for the two phases A and B respectively. From these leads the currents divide through choke coils or auto-transformers $c$ to the motor leads $l^4$, $l^5$, $l^6$, $l^7$, $l^8$, $l^9$, $l^{10}$, $l^{11}$, which are connected to the primary at the proper points to produce four poles therein. One of the secondaries, as S, is also connected for four poles, as shown, through choke coils $a$. The other secondary, S', is provided at four points with connections for two poles, but the connections lead to the middle points of the choke coils $a$, as shown.

The operation of the motor will now be clear. The currents in the primary P, in which there are four poles, have no effect on the secondary winding S', (since the latter is connected for only two poles), but do affect the secondary winding S, which is connected for four poles. The currents in the latter secondary winding, however, flow into the other secondary, S', through its two-pole connections from the auto-transformers. The latter secondary winding thus becomes a primary with two poles, and hence tends to induce current in the primary P which would flow out from the same through motor leads $l^4$, $l^5$, $l^6$, $l^7$, which constitute a two-pole connection. The circuits of these currents from the windings P are, however, practically open, since the choke coils $c$ prevent the currents from flowing from one lead to the other, and consequently no work current can flow in the secondaries. It is therefore necessary to close one or more of these circuits, from the winding P, as by means of conductors $d$, $d'$ and $d^2$, $d^3$. The result is, according to the principle of the well known method of "concatenated control", that the rotating element rotates at six-pole synchronous speed although there are only four poles in the motor primary P, produced directly from the same source C.

Inserted in the conductors $d$, and $d'$, $d^2$, and $d^3$ are rheostats R, R, or condensers, reactances or other controlling devices or combinations of two or more of these, according to the results desired, by which the currents in the conductors mentioned, from the motor primary P, may be controlled or modified as desired. The modification of these currents correspondingly modifies the currents in the secondary, effecting a corresponding change of speed of the rotating element. By providing three windings or secondaries on the inner element, one connected for two poles, one for four, and one for eight, a synchronous speed corresponding to twelve poles and another corresponding to ten poles can be obtained, when eight poles are produced in the primary or outside element, while by changing the number of poles in the latter to four a synchronous speed corresponding to six poles can be obtained, with rheostatic control of each through the outside element, entirely without the use of collector rings. Other arrangements might be mentioned, with fewer or more windings, or other numbers of poles, or both, giving other speeds, with rheostatic control through the outer element, it being clear that the invention is in no way limited to the specific forms herein referred to.

It is immaterial which pole connections to the outside elements are used for the rheostat and which for the supply of current from the source in producing a given synchronous speed, that is, for example, the outside element may have eight poles, with the rheostat connected through 4-pole connections, or vice versa, and the same speed will be produced, corresponding to twelve poles. Other speeds can of course be obtained by employing more windings, either primary or secondary, or both, or other pole numbers, or suitable combinations of these, as desired.

The motor shown in the drawing is supplied with polyphase current from the source of power, but it is clear that the invention is applicable to single phase apparatus as well. In either case, however, the connections from secondary to secondary would preferably be polyphase. Nor is it necessary to connect the leads from the source to single points in the primary; instead, they may be connected at a plurality of points for each, as for the purpose of obtaining some particular flux distribution in accordance with the invention described and claimed broadly in my copending application, Ser. No. 367,529. The type of winding or windings employed is also immaterial, whether ring, as shown, drum, or polar, open or closed coil, it being observed that with closed coil windings the pole windings thereof must be in series or the equivalent, as explained hereinbefore, to produce the condition of non-mutuality where desired.

What I claim is:

1. In an alternating current machine, the combination of a primary winding having poles produced therein; a secondary element adapted to have current induced therein corresponding to poles in the said primary winding, and capable of inducing other poles in the said primary winding; and means for closing the circuit or circuits of current induced in the said primary winding; as set forth.

2. In an alternating current machine, the combination of a primary winding having poles produced therein; a secondary element adapted to have current induced therein corresponding to poles in the said primary winding, and capable of inducing other poles in the said primary winding; means for closing the circuit or circuits of current induced in the said primary winding; and means for regulating such induced current or currents; as set forth.

3. In an alternating current machine, the combination of a primary winding having poles produced therein; a secondary element having a plurality of windings, a portion of said plurality of windings being adapted to have current induced therein corresponding to poles in the said primary winding, and a portion being adapted to induce other poles in the said primary winding; and means for closing the circuit or circuits of current induced in the said primary winding; as set forth.

4. In an alternating current machine, the combination of a primary winding having poles produced therein; a secondary element having a plurality of windings, a portion of said plurality of windings being adapted to have current induced therein corresponding to poles in the said primary winding, and a portion being adapted to induce other poles in the said primary winding; means for closing the circuit or circuits of current induced in the said primary winding; and means for regulating such induced current; as set forth.

5. In an alternating current machine, the combination of a primary winding; a plurality of interconnected secondary windings, a portion thereof being adapted to have current induced therein by current from the said primary winding, and a portion adapted to induce current in the said primary winding; and means for closing the circuit or circuits of current induced in the said primary winding; as set forth.

6. In an alternating current machine, the combination of a primary winding; a plurality of interconnected secondary windings, a portion thereof being adapted to have current induced therein by current from the said primary winding, and a portion adapted to induce current in the said primary winding; means for closing the circuit or circuits of current induced in the said primary winding; and means for regulating current in said circuit or circuits; as set forth.

7. In an alternating current machine, the combination of a primary element; a plurality of secondary windings, a portion thereof having pole connections provided with auto-transformers, and a portion having pole connections to the auto-transformers; and means for closing the circuit or circuits of current induced in the primary element; as set forth.

8. In an alternating current machine, the combination of a primary element; a plurality of secondary windings, a portion thereof having pole connections provided with auto-transformers, and a portion having pole connections to the auto-transformers; means for closing the circuit or circuits of current induced in the primary element; and means for regulating current in said circuit or circuits; as set forth.

9. In an alternating current machine, the combination of a primary element adapted to have poles produced therein; a secondary winding having pole connections for a number of poles mutual to poles in the primary element; auto-transformers in the pole connections; a secondary winding having pole connections from the auto-transformers to produce a different number of poles; and means for closing the circuit or circuits of current induced in the primary element; as set forth.

10. In an alternating current machine, the combination of a primary element adapted to have poles produced therein; a secondary winding having pole connections for a number of poles mutual to poles in the primary element; auto-transformers in the pole connections; a secondary winding having pole connections from the auto-transformers to produce a different number of poles; means for closing the circuit or circuits of current induced in the primary element; and means for regulating current in said circuit or circuits; as set forth.

11. In an alternating current machine, a secondary element having a plurality of windings, a portion thereof having pole connections provided with auto-transformers and a portion having pole connections to the auto-transformers, as set forth.

12. In an alternating current machine, a secondary element having a plurality of windings, a portion thereof having pole connections provided with auto-transformers and a portion having pole connections to the centers of the auto-transformers, as set forth.

RALPH D. MERSHON.

Witnesses:
 STURGES S. DUNHAM,
 RAPHAEL A. WEED.